United States Patent
Kisaka

[19]

[11] Patent Number: 5,805,374
[45] Date of Patent: *Sep. 8, 1998

[54] METHOD AND APPARATUS FOR FAST POSITIONING A HEAD OF A RECORDING DEVICE

[75] Inventor: Masashi Kisaka, Yokohama, Japan

[73] Assignee: International Business Machines Corporation, Armonk, N.Y.

[*] Notice: The term of this patent shall not extend beyond the expiration date of Pat. No. 5,561,568.

[21] Appl. No.: 650,250

[22] Filed: May 22, 1996

Related U.S. Application Data

[63] Continuation of Ser. No. 962,445, Oct. 16, 1992, Pat. No. 5,561,568.

[51] Int. Cl.[6] .................................................. G11B 5/596
[52] U.S. Cl. ..................................... 360/78.04; 360/78.08
[58] Field of Search ........................... 360/78.04, 78.06, 360/78.07, 78.08; 369/44.29, 44.35, 43, 32; 318/561

[56] References Cited

U.S. PATENT DOCUMENTS

| | | | |
|---|---|---|---|
| 4,907,109 | 3/1990 | Senio | 360/78.04 |
| 5,164,931 | 11/1992 | Yamaguchi et al. | 360/78.05 X |
| 5,168,398 | 12/1992 | Kanada et al. | 360/78.04 |
| 5,369,345 | 11/1994 | Phan et al. | 360/78.09 X |

FOREIGN PATENT DOCUMENTS 0378327  7/1990  European Pat. Off. .

OTHER PUBLICATIONS

Patent Abstract ofJapan vol. 013382, Takayuki, Magnetic Disk Device, Aug. 24, 1989.
Patent Abstract of Japan, vol. 015214, Yozo, Magnetic Head Speed Controller and Magnetic Disk Device, Mar. 13, 1991.
Patent Abstract of Japan, vol. 012341, Yoshitaka, Magnetic Disk Device, Sep. 13, 1988.
Oswald, Head Positioning Servo Systems and High Track Densitty, Mar. 24, 1988.

*Primary Examiner*—Andrew L. Sniezek
*Attorney, Agent, or Firm*—Michael F. Hoffman; Schmeiser, Olsen & Watts

[57] ABSTRACT

To achieve fast positioning of a head by determining an initial value dynamically from state variables of a system at a switching time of control modes. In a recording device having a head, a recording media including a plurality of tracks accessed by the head, and a motor for moving the head, in order to position the head to a target track by switching control modes and outputting a control signal value u(n) to drive the motor in response to an input signal value y(n) representing a difference between a current position of the head and the target track, the gain of a control system having the input and control signal values as state variables is changed only at a mode switching time.

18 Claims, 5 Drawing Sheets

METHOD AND APPARATUS FOR FAST POSITIONING A HEAD OF A RECORDING DEVICE

This application is a continuation of application Ser. No. 07/962,445, filed Oct. 16, 1992, now U.S. Pat. No. 5,561,568.

DETAILED DESCRIPTION OF THE INVENTION

1. Field of the Invention

This invention relates to a method and apparatus for fast positioning a head of a recording device having a recording media including a plurality of tracks to a target track, and more particularly to a method and apparatus for positioning a head of a magnetic disk device or a magneto-optical disk device by closed loop control.

2. Background of the Invention

In positioning a head of a disk device to a target track by a seek operation, control inputs to a voice coil motor (VCM) for driving the head are provided in velocity control mode, settling mode, and track following mode. The settling mode, together with the track following mode is often called position control mode. Because each of these modes controls differently, an overshoot would occur to result in a longer time for positioning the head to the target track unless initialization is adequate when the velocity control mode is switched to the settling mode or when the settling mode is switched to the track following mode. In the conventional positioning systems, there is generally nothing special to be done in mode switching from velocity control to settling, and a value which is stored when the head rests on the target track is used as an initial output value of an integrator when the settling mode is switched to the track following mode. However, such a method does not guarantee fast positioning.

Japanese Published Unexamined Patent Application (PUPA) No. 2-244467 discloses a control method for positioning in a magnetic disk device which performs seek control for moving a head to a target track and following control for positioning a head at the center of the target track, wherein a part of calculation of a digital filter used in the following control is processed in parallel with the seek control during a predetermined period immediately before the mode switching time. According to the method, the most suitable initial value of a state variable is provided when the seek control is switched to the following control, so that an overshoot of a head is prevented. However, this control method needs parallel calculations and is complex in comparison with the present invention which uses only state variables at the mode switching time.

Japanese PUPA No. 2-304782 discloses a control method in a magnetic disk device which uses velocity control for moving a head to a target track and position control for positioning the head to the target track, wherein an initial manipulated variable and cut-off frequency in the position control are adjusted depending on an initial position and initial velocity at the switching time from the velocity control to the position control so that an overshoot is prevented. However, it is undesirable in terms of accuracy to make use of velocity. Besides, even the cut-off frequency must be adjusted in this method, which becomes complicated in comparison with the present invention.

As described above, the conventional methods for preventing an overshoot of a head need extra calculations and operations. Therefore, it is desired to initialize more simply at the mode switching time.

An object of the present invention is to enable fast positioning of the head by determining an initial value dynamically from state variables of a system at the mode switching time.

A further object of the present invention is to enable fast positioning of the head by adding a feedforward value which is determined by state variables at the time when the velocity control mode is switched to the settling mode.

A still further object of the present invention is to enable fast positioning of the head by using, as an initial value of an integrator, a value which is determined by state variables at the time when the settling mode is switched to the track following mode.

SUMMARY OF THE INVENTION

The present invention relates to, in a recording device having a head, a recording media (for example, a magnetic disk) including a plurality of tracks accessed by the head, and a motor for moving the head, a method and an apparatus for positioning the head to a target track by switching control modes and outputting a control signal value to drive a motor in response to an input signal value representing a difference between a current position of the head and the target track. According to the present invention, the gain of a control system in which the input and control signal values are state variables is changed only at a switching time of the control modes to fast converge to the target track. More particularly, the gain is changed by adding to the control signal value an initial value which nullifies a term of an eigenvalue having a maximum absolute value in a state equation of the above-mentioned control system, only at the mode switching time.

The addition of the initial value is done only when a velocity control mode is switched to a position control mode, that is, only at the start time of the position control mode. The position control mode includes a settling mode not using an integrator and a track following mode using an integrator, and a similar initial value is generated and used as an initial output value of the integrator also when the settling mode is switched to the track following mode.

DESCRIPTION OF PREFERRED EMBODIMENT

Figure 1:
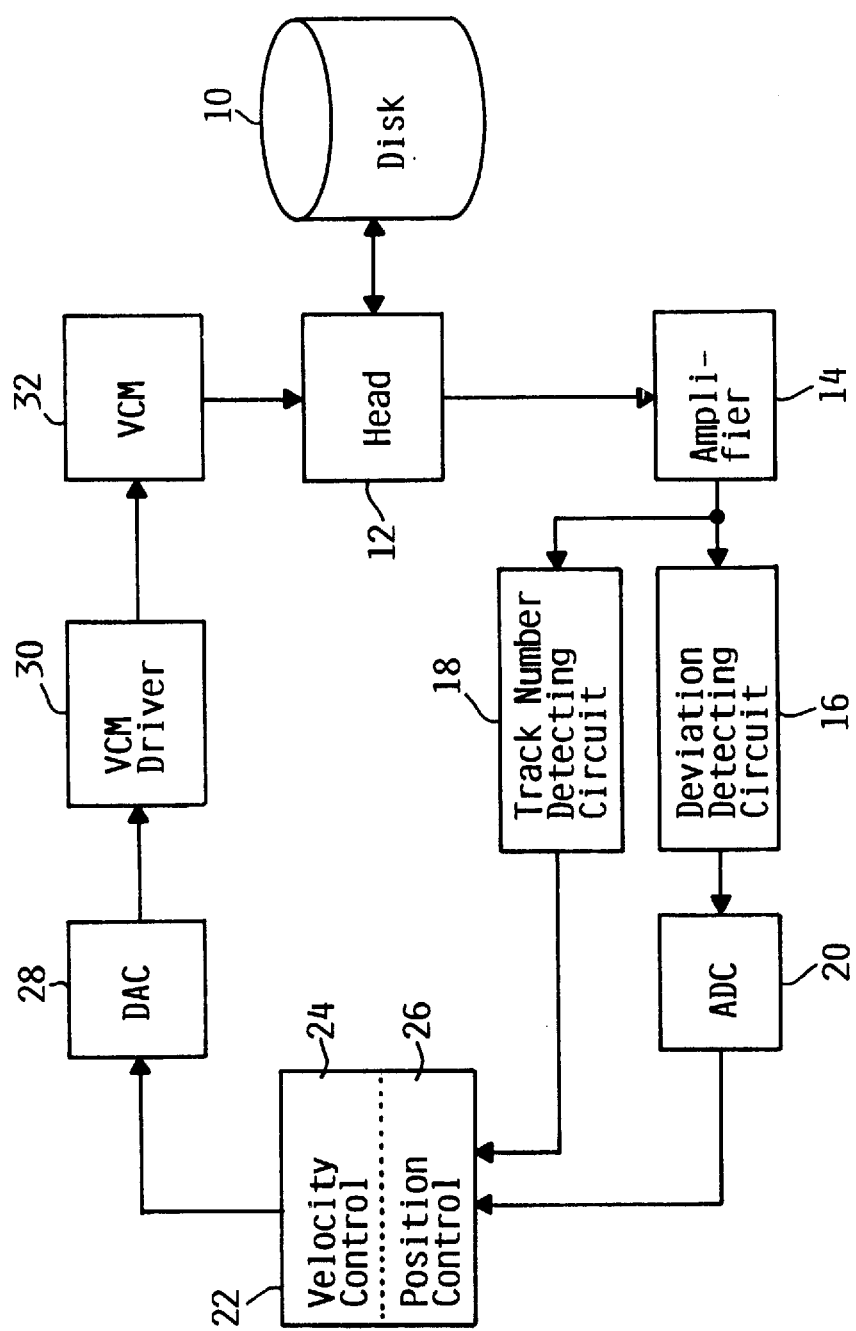
FIG. 1 is a block diagram showing an example of a magnetic disk apparatus to which the present invention is applicable.

FIG. 1 shows an embodiment of a magnetic disk device in which a head is positioned according to the present invention. The embodiment is intended for a magnetic disk device in which a head is positioned by the sector servo scheme, but the present invention may be applied to other positioning schemes. The sector servo scheme is to perform velocity control and position control by reading servo information in succession by a head 12 to detect a head position in which each track of a disk 10 including a plurality of tracks is divided into a plurality of sectors and the servo information is written at each boundary of the sectors. Usually, a head position is represented by the number of the track on which the head 12 is currently positioned and the amount of deviation from the center of the track. The servo information read by the head 12 is amplified by an amplifier 14 and then sent to a deviation detecting circuit 16 and a track number detecting circuit 18. The deviation detecting circuit 16 demodulates a burst pattern contained in the servo information, generates a deviation signal indicating how the head 12 is shifted from the center of the track and sends the signal to an analog-to-digital converter (ADC) 20. The ADC 20 samples the deviation signal at a predetermined sampling frequency and supplies the signal to a digital positioning apparatus 22. Assuming that a rotational speed of the disk 10 is 3600 rpm and the number of sectors per track is 30, then the sampling frequency will be 1800 Hz. In this case, the ADC 20 outputs a sample value of the deviation signal every about 555 μs. The track number detecting circuit 18 pulses the output from the amplifier 14, detects the track number written in a gray code in a servo area, and then supplies the track number to the positioning apparatus 22 in a form of binary data. The positioning apparatus 22 takes in the track number at the sampling interval described above.

The positioning apparatus 22 comprising a velocity control section 24 and a position control section 26 monitors a difference (hereinafter referred to as a positional error) between a head position and a target track which is represented by a deviation signal value from the ADC 20 and a track number from the track number detecting circuit 18. While the difference is larger than a predetermined number of tracks (for example, 16 tracks) during a seek operation, the positioning apparatus 22 is in the velocity control mode in which the velocity control section 24 controls the movement of the head 12 according to a previously established velocity curve as is well known in the art. When the positional error reaches 16 tracks, control for the movement of the head is switched from the velocity control section 24 to the position control section 26. As described below in detail, the position control section 26 operates in the settling mode or the track following mode, and entered from the velocity control mode is the settling mode. When the positional error reaches, for example, one track, the settling mode is switched to the track following mode to do final head positioning.

Digital control output from the positioning apparatus 22 is converted to an analog signal by a digital-to-analog converter (DAC) 28 and then is supplied to a VCM driver 30. The VCM driver 30 responds to the analog control signal from the DAC 28 and supplies current proportional to the signal to a VCM 32, which moves the head 12.

The following is the detailed description of the settling mode and track following mode of the position control section 26. As described above, when the positional error reaches 16 tracks, the velocity control mode is switched to the settling mode. It is noted that this difference of 16 tracks may vary depending on a design and the present invention is not limited to this value. In the settling mode, an appropriate feedback value is determined from a transfer function of the VCM 32 according to a state space equation in which a positional error y(n) at time n and a control output value u(n) at the same time n are state variables. Assuming that there is no offset for convenience sake, the pulse transfer function of the VCM 32 is:

$$Y(z) = U(z) \frac{az^{-1} + bz^{-2} + cz^{-3}}{(1 - z^{-1})^2} \quad \text{[Equation 1]}$$

In Equation 1, Y(z) and U(z) represent Z-transformations of y(n) and u(n), respectively. The constants a, b, and c are determined by characteristics of a motor, sampling time, delay time, and electric circuits, and for a typical 2.5" disk, the constants are as follows:

a=0.54 b=1.8 c=0.145

Equation 1 can be represented using a difference equation as follows:

$$y(n+1) = 2y(n) - y(n-1) + bu(n-1) + cu(n-2) + au(n)$$

If there is an offset o(n), d o(n) is added to the right side. From this equation the following state space equation is obtained.

$$\begin{vmatrix} y(n+1) \\ y(n) \\ u(n) \\ u(n-1) \end{vmatrix} = \begin{vmatrix} 2 & -1 & b & c \\ 1 & 0 & 0 & 0 \\ 0 & 0 & 0 & 0 \\ 0 & 0 & 1 & 0 \end{vmatrix} \begin{vmatrix} y(n) \\ y(n-1) \\ u(n-1) \\ u(n-2) \end{vmatrix} + \begin{vmatrix} a \\ 0 \\ 1 \\ 0 \end{vmatrix} u(n) \quad \text{[Equation 2]}$$

Now, when u(n) is calculated, considering feedback, as $$u(n) = [K1 \, K2 \, K3 \, K4] \begin{vmatrix} y(n) \\ y(n-1) \\ u(n-1) \\ u(n-2) \end{vmatrix} \quad \text{[Equation 3]}$$

then Equation 2 becomes as follows:

$$\begin{vmatrix} y(n+1) \\ y(n) \\ u(n) \\ u(n-1) \end{vmatrix} = \begin{vmatrix} 2 & -1 & b & c \\ 1 & 0 & 0 & 0 \\ 0 & 0 & 0 & 0 \\ 0 & 0 & 1 & 0 \end{vmatrix} \begin{vmatrix} y(n) \\ y(n-1) \\ u(n-1) \\ u(n-2) \end{vmatrix} + \begin{vmatrix} a \\ 0 \\ 1 \\ 0 \end{vmatrix} [K1 \, K2 \, K3 \, K4] \begin{vmatrix} y(n) \\ y(n-1) \\ u(n-1) \\ u(n-2) \end{vmatrix} \quad \text{[Equation 4]}$$

$$= \begin{vmatrix} 2+aK1 & -1+aK2 & b+aK3 & c+aK4 \\ 1 & 0 & 0 & 0 \\ K1 & K2 & K3 & K4 \\ 0 & 0 & 1 & 0 \end{vmatrix} \begin{vmatrix} y(n) \\ y(n-1) \\ u(n-1) \\ u(n-2) \end{vmatrix}$$

or $$P(n+1) = Q \, P(n)$$

Supposing that eigenvalues of the matrix Q are 1, 2, 3, and 4 (for convenience, it is assumed that there is no multiple root), eigenvectors V i with respect to i (i=1, 2, 3, 4) are:

$$Vi = \begin{vmatrix} i \\ 1 \\ i/Ki \\ 1/Ki \end{vmatrix} \quad \text{[Equation 5]}$$

$$Ki = \frac{a i^2 + b i + c}{i^2 - 2i + 1} \quad \text{[Equation 6]}$$

It is possible to calculate feedback coefficients K1, K2, K3, and K4 from Equation 4 according to a well-known design method such as pole assignment method. Though such feedback is done during the settling mode, as described above, an overshoot would occur to result in a longer positioning time if position control is performed according to the above equations immediately after the velocity control mode is switched to the settling mode. The present invention therefore adds a specific value r0 to a control output value u(m) at the start time t=m of the settling mode. This means that u(n) in Equations 2 and 3 is replaced by u(m)+r0. Thereby Equation 4 can be written as follows:

$$\begin{vmatrix} y(m+1) \\ y(m) \\ u(m) \\ u(m-1) \end{vmatrix} = \quad \text{[Equation 7]}$$

$$\begin{vmatrix} 2+aK1 & -1+aK2 & b+aK3 & c+aK4 \\ 1 & 0 & 0 & 0 \\ K1 & K2 & K3 & K4 \\ 0 & 0 & 1 & 0 \end{vmatrix} \begin{vmatrix} y(m) \\ y(m-1) \\ u(m-1) \\ u(m-2) \end{vmatrix} +$$

$$\begin{vmatrix} a \\ 0 \\ 1 \\ 0 \end{vmatrix} r0$$

and from time m+1 on as:

$$\begin{vmatrix} y(n+1) \\ y(n) \\ u(n) \\ u(n-1) \end{vmatrix} = \begin{vmatrix} 2+aK1 & -1+aK2 & b+aK3 & c+aK4 \\ 1 & 0 & 0 & 0 \\ K1 & K2 & K3 & K4 \\ 0 & 0 & 1 & 0 \end{vmatrix} \begin{vmatrix} y(n) \\ y(n-1) \\ u(n-1) \\ u(n-2) \end{vmatrix} \quad \text{[Equation 8]}$$

$$= \begin{vmatrix} 2+aK1 & -1+aK2 & b+aK3 & c+aK4 \\ 1 & 0 & 0 & 0 \\ K1 & K2 & K3 & K4 \\ 0 & 0 & 1 & 0 \end{vmatrix}^2 \begin{vmatrix} y(n-1) \\ y(n-2) \\ u(n-2) \\ u(n-3) \end{vmatrix} = \ldots$$

$$= \begin{vmatrix} 2+aK1 & -1+aK2 & b+aK3 & c+aK4 \\ 1 & 0 & 0 & 0 \\ K1 & K2 & K3 & K4 \\ 0 & 0 & 1 & 0 \end{vmatrix}^{n-m} \begin{vmatrix} y(m+1) \\ y(m1) \\ u(m1) \\ u(m-1) \end{vmatrix}$$

$$= \begin{vmatrix} 2+aK1 & -1+aK2 & b+aK3 & c+aK4 \\ 1 & 0 & 0 & 0 \\ K1 & K2 & K3 & K4 \\ 0 & 0 & 1 & 0 \end{vmatrix}^{n-m} (AV1+BV2+CV3+DV4)$$

$$= A\,1^{n-m}V1 + B\,2^{n-m}V2 + C\,3^{n-m}V3 + D\,4^{n-m}V4$$

where $$\begin{vmatrix} y(m+1) \\ y(m) \\ u(m) \\ u(m-1) \end{vmatrix} = AV1 + BV2 + CV3 + DV4 \quad \text{[Equation 9]}$$

Now, if the absolute value of 4 is larger than the absolute values of other eigenvalues, only a term of coefficient D remains to the last in Equation 8 as n becomes larger. From Equations 7 and 8 the following equation can be obtained.

$$\begin{vmatrix} A \\ B \\ C \\ D \end{vmatrix} = [V1\ V2\ V3\ V4]$$

$$\begin{vmatrix} 2+aK1 & -1+aK2 & b+aK3 & c+aK4 \\ 1 & 0 & 0 & 0 \\ K1 & K2 & K3 & K4 \\ 0 & 0 & 1 & 0 \end{vmatrix} \begin{vmatrix} y(m) \\ y(m-1) \\ u(m-1) \\ u(m-2) \end{vmatrix} + \begin{vmatrix} a \\ 0 \\ 1 \\ 0 \end{vmatrix} r0$$

[Equation 10]

Since an unknown on the right side of this equation is only r0, r0 can be solved by making D=0. r0 is then written as follows:

$$r0 = L1y(m) + L2y(m-1) + L3u(m-1) + L4u(m-2)$$

As is obvious from the above, r0 is a dynamic value which depends upon only inputs and outputs of a system. If r0 is added to a previously designed feedback value at time m, Equation 8 becomes $$\begin{vmatrix} y(n+1) \\ y(n) \\ u(n) \\ u(n-1) \end{vmatrix} = A\ 1^{n-m} V1 + B\ 2^{n-m} V2 + C\ 3^{n-m} V3$$

[Equation 11]

which is represented by fast converging eigenvalues, allowing the fast positioning.

Figure 2:
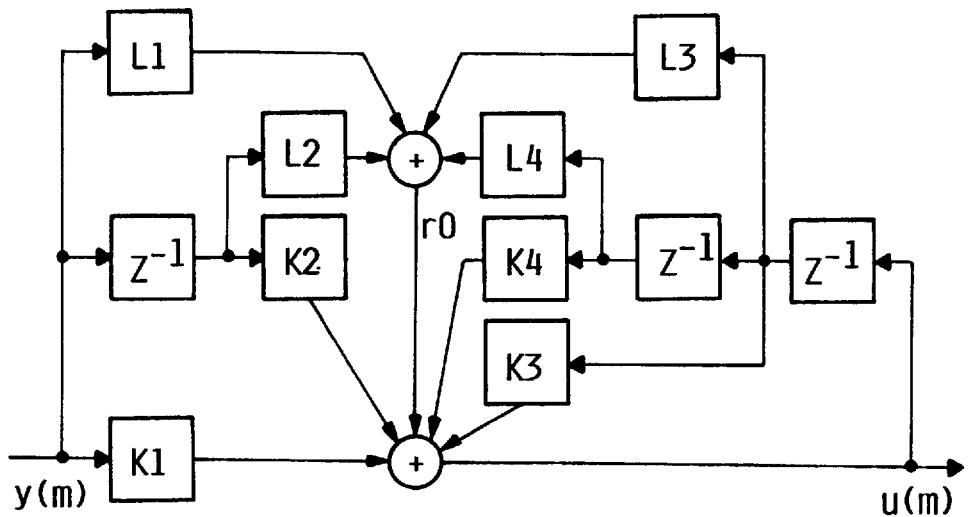
FIG. 2 is a block diagram showing the configuration of a position control section at a switching time from velocity control mode to settling mode.
Figure 3:
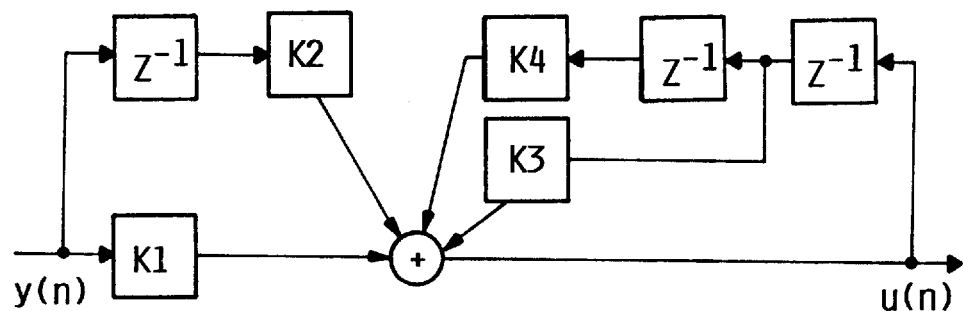
FIG. 3 is a block diagram showing the configuration of the position control section in the settling mode after switching.

FIG. 2 shows the configuration of the position control section 24 at time m when the velocity control mode is switched to the settling mode, and FIG. 3 shows the configuration thereafter till the switching to the track following mode. Each configuration comprises multiplication elements (Ki, Li), addition element(s) (+), and one sample delay elements ($Z^{-1}$) In FIG. 2, it is seen that a feedforward value r0 which is added to the output at time m is generated according to the above equation of r0. That is, r0 is generated by multiplying the input signal value y(m) at the mode switching time, input signal value y(m−1) and control signal value u(m−1) of one sample before the switching time, and control signal value u(m−2) of two samples before with the given coefficients L1, L2, L3, and L4, respectively, and by adding their products. The configurations of FIG. 2 and FIG. 3 are of a digital filter in which adding r0 at time m means changing gain of the filter only at that moment. This change of gain is achieved by setting r0 so that the term of the eigenvalue 4 whose absolute value is maximum (the term of the coefficient D) in the state equation of Equation 8 becomes zero.

Figure 4:
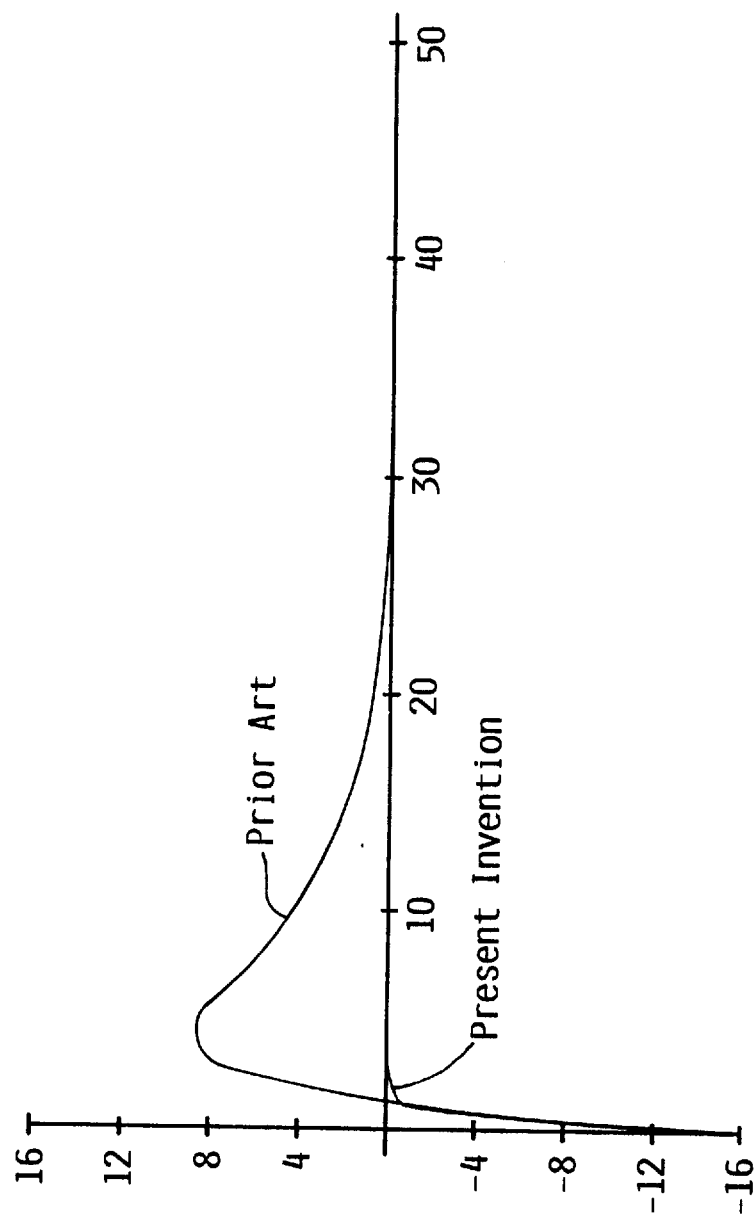
FIG. 4 is a graph showing the state of convergence according to the present invention compared with prior art in the settling mode.

FIG. 4 shows, in comparison with prior art, the state of convergence in which a feedforward value is added at a mode switching time according to the present invention. As shown in the figure, the present invention makes it possible to converge considerably faster than the prior art. FIG. 4 shows an example in which eigenvalues i and coefficients Ki and Li are chosen as follows:

1 = 0.0    2 = 0.1    3 = 0.5    4 = 0.85
K1 = −0.26   K2 = 0.23   K3 = −0.41   K4 = −0.034
L1 = −0.46   L2 = 0.30   L3 = −0.61   L4 = −0.044

In the settling mode, when the input positional error y(n) reaches a second value (for example, one track), the mode is switched to the track following mode. In the track following mode, fine control is performed using an integrator. With z(n) being a value of the integrator at time n, an equation of the integrator can be written as follows:

$$z(n+1) = z(n) + y(n)$$

Since an offset is of significance in the track following mode, let the offset be o(n). Adding the integrator and offset to Equation 2 makes.

$$\begin{vmatrix} y(n+1) \\ y(n) \\ u(n) \\ u(n-1) \\ z(n+1) \\ o(n+1) \end{vmatrix} =$$

$$\begin{vmatrix} 2 & -1 & b & c & 0 & d \\ 1 & 0 & 0 & 0 & 0 & 0 \\ 0 & 0 & 0 & 0 & 0 & 0 \\ 0 & 0 & 1 & 0 & 0 & 0 \\ 1 & 0 & 0 & 0 & 1 & 0 \\ 0 & 0 & 0 & 0 & 0 & 1 \end{vmatrix} \begin{vmatrix} y(n) \\ y(n-1) \\ u(n-1) \\ u(n-2) \\ z(n) \\ o(n) \end{vmatrix} + \begin{vmatrix} a \\ 0 \\ 1 \\ 0 \\ 0 \\ 0 \end{vmatrix} u(n)$$

[Equation 12]

from which the following equation similar to Equation 4 can be obtained.

$$\begin{vmatrix} y(n+1) \\ y(n) \\ u(n) \\ u(n-1) \\ z(n+1) \\ o(n+1) \end{vmatrix} =$$

$$\begin{vmatrix} 2+aK1 & -1+aK2 & b+aK3 & c+aK4 & aK5 & d \\ 1 & 0 & 0 & 0 & 0 & 0 \\ K1 & K2 & K3 & K4 & K5 & 0 \\ 0 & 0 & 1 & 0 & 0 & 0 \\ 1 & 0 & 0 & 0 & 1 & 0 \\ 0 & 0 & 0 & 0 & 0 & 1 \end{vmatrix} \begin{vmatrix} y(n) \\ y(n-1) \\ u(n-1) \\ u(n-2) \\ z(n) \\ o(n) \end{vmatrix}$$

[Equation 13]

Eigenvalues of Equation 13 are i(i=1 . . . 5) which can be arbitrarily chosen, and 1(=6). The corresponding eigenvectors are expressed as follows:

$$Vi = \begin{vmatrix} i \\ 1 \\ i/Ki \\ 1/Ki \\ i/(i-1) \\ 0 \end{vmatrix} \quad \text{[Equation 14]}$$

$$Ki = \frac{a\,i^2 + b\,i + c}{i^2 - 2i + 1} \quad \text{[Equation 15]}$$

and $$V1 = \begin{vmatrix} 0 \\ 0 \\ -1 \\ -1 \\ -(1-K3-K4)/K5 \\ 1 \end{vmatrix} \quad \text{[Equation 16]}$$

If the settling mode is switched to the track following mode at time t=p, the following is obtained from Equation 13.

$$\begin{vmatrix} y(n+1) \\ y(n) \\ u(n) \\ u(n-1) \\ z(n+1) \\ o(n+1) \end{vmatrix} = \begin{vmatrix} 2+aK1 & -1+aK2 & b+aK3 & c+aK4 & aK5 & d \\ 1 & 0 & 0 & 0 & 0 & 0 \\ K1 & K2 & K3 & K4 & K5 & 0 \\ 0 & 0 & 1 & 0 & 0 & 0 \\ 1 & 0 & 0 & 0 & 1 & 0 \\ 0 & 0 & 0 & 0 & 0 & 1 \end{vmatrix} \begin{vmatrix} y(n) \\ y(n-1) \\ u(n-1) \\ u(n-2) \\ z(n) \\ o(n) \end{vmatrix} \quad \text{[Equation 17]}$$

$$= \begin{vmatrix} 2+aK1 & -1+aK2 & b+aK3 & c+aK4 & aK5 & d \\ 1 & 0 & 0 & 0 & 0 & 0 \\ K1 & K2 & K3 & K4 & K5 & 0 \\ 0 & 0 & 1 & 0 & 0 & 0 \\ 1 & 0 & 0 & 0 & 1 & 0 \\ 0 & 0 & 0 & 0 & 0 & 1 \end{vmatrix}^2 \begin{vmatrix} y(n-1) \\ y(n-2) \\ u(n-2) \\ u(n-3) \\ z(n-1) \\ o(n-1) \end{vmatrix} = \ldots$$

$$= \begin{vmatrix} 2+aK1 & -1+aK2 & b+aK3 & c+aK4 & aK5 & d \\ 1 & 0 & 0 & 0 & 0 & 0 \\ K1 & K2 & K3 & K4 & K5 & 0 \\ 0 & 0 & 1 & 0 & 0 & 0 \\ 1 & 0 & 0 & 0 & 1 & 0 \\ 0 & 0 & 0 & 0 & 0 & 1 \end{vmatrix}^{n-p+1} \begin{vmatrix} y(p) \\ y(p-1) \\ u(p-1) \\ u(p-2) \\ z(p) \\ o(p) \end{vmatrix}$$

$$= E\,1^{n-p+1}V1 + F\,2^{n-p+1}V2 + G\,3^{n-p+1}V3 + H\,4^{n-p+1}V4 + I\,5^{n-p+1}V5 + JV1$$

$$\begin{vmatrix} E \\ F \\ G \\ H \\ I \\ J \end{vmatrix} = [V1\ V2\ V3\ V4\ V5\ V1]^{-1} \begin{vmatrix} y(p) \\ y(p-1) \\ u(p-1) \\ u(p-2) \\ z(p) \\ o(p) \end{vmatrix} \quad \text{[Equation 18]}$$

Figure 5:
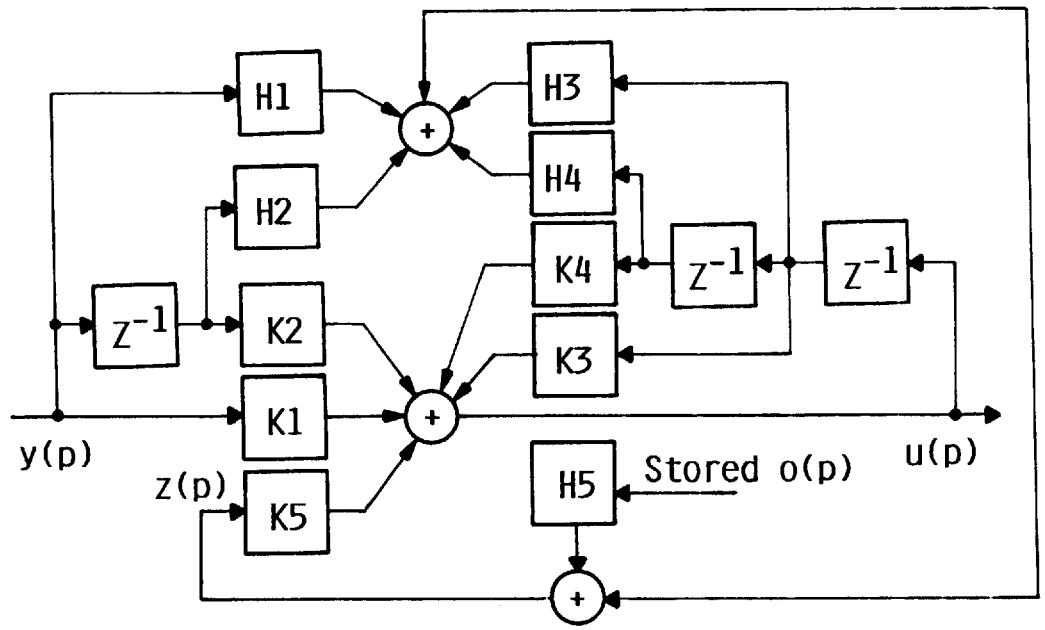
FIG. 5 is a block diagram showing the configuration of a position control section at a switching time from the settling mode to a track following mode.
Figure 6:
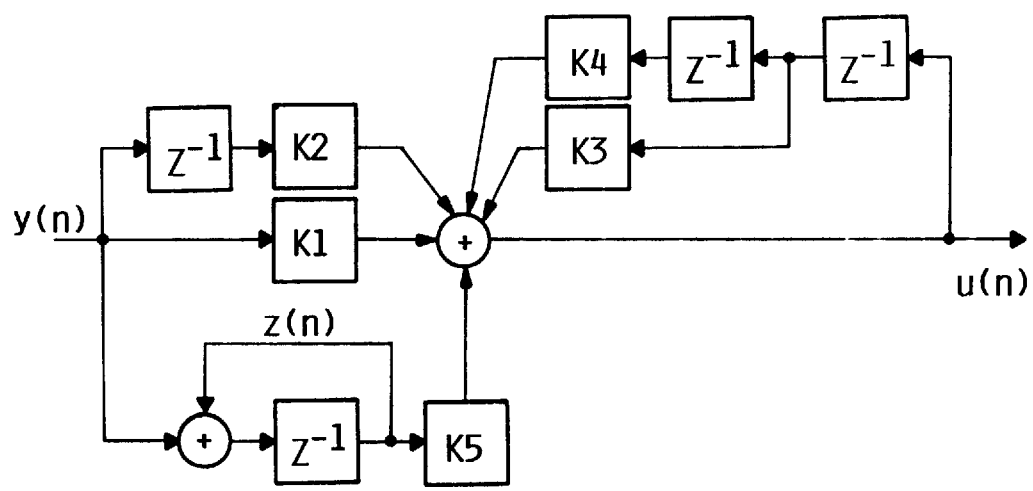
FIG. 6 is a block diagram showing the configuration of the position control section in the track following mode after switching.

E through J are determined from Equation 18. Assuming that an eigenvalue whose absolute value is maximum is 5, fast convergence is achieved for the same reason as described in the case of the settling mode if z(p) is selected so as to be I=0. z(p) is expressed as follows:

$$z(p) = H1y(p) + H2y(p-1) + H3u(p-1) + H4u(p-2) + H5o(p)$$

where, o(p) is a value which is outputted to the DAC 28 when a stationary state is reached in the track following mode and, therefore, is available at time p if a value which was outputted when the stationary state was previously reached has been stored in the positioning apparatus 22. Thus if the above value of z(p) is given as an initial value of the integrator at time p, positioning converges fast. FIG. 5 shows the configuration of the position control section 26 at time p when the settling mode is switched to the track following mode, and FIG. 6 shows the configuration at and after time p+1. In FIG. 5 and FIG. 6, the values of coefficients K1 to K4 are not necessarily the same as those in the settling mode.

Figure 7:
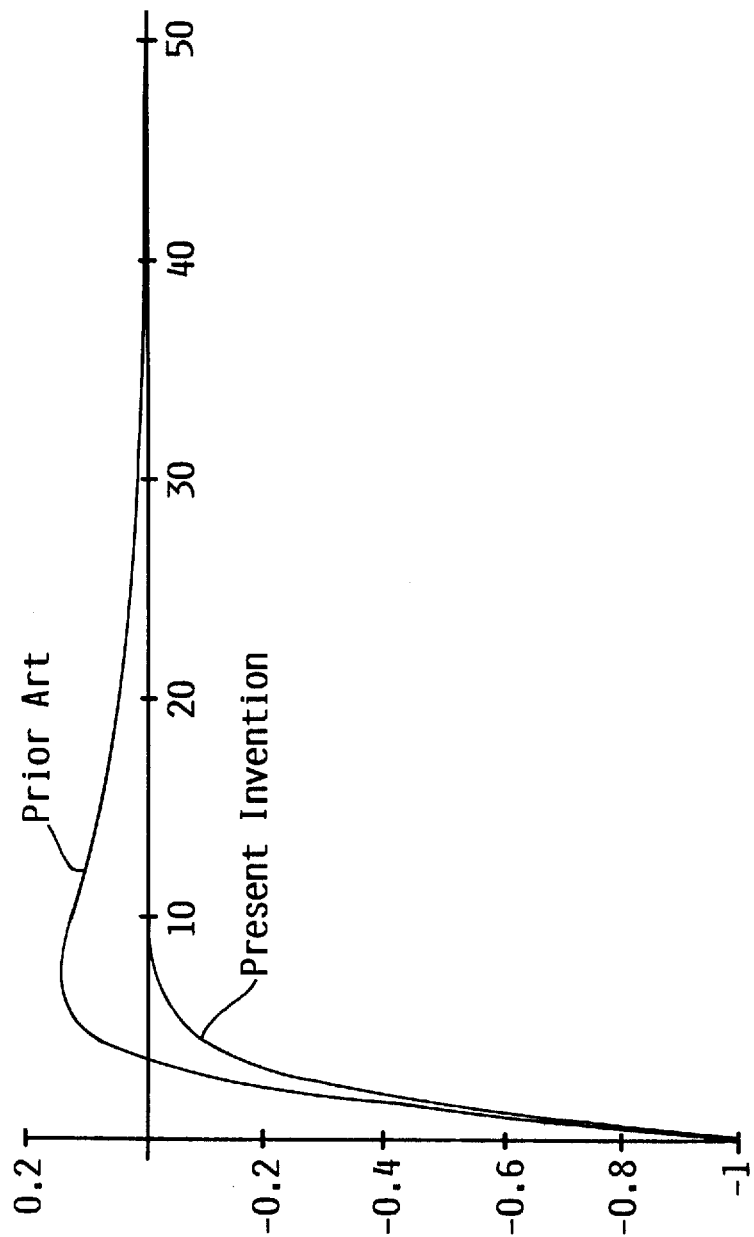
FIG. 7 is a graph showing the state of convergence according to the present invention compared with prior art in the track following mode.

FIG. 7 shows the state of convergence in the track following mode according to the present invention, in comparison with the prior art in which only a stationary value is added at the mode switching time. It is seen that the present invention makes it possible to converge considerably faster than the prior art. FIG. 7 shows an example in which eigenvalues i and coefficients Ki and Hi are chosen as follows:

| | | | | |
|---|---|---|---|---|
| 1 = 0.0 | 2 = 0.07 + 0.1i | 3 = 0.07 − 0.1i | 4 = 0.54 | 5 = 0.918 |
| K1 = −0.90 | K2 = 0.64 | K3 = −1.20 | K4 = −0.093 | K5 = −0.017 |
| H1 = −4.22 | H2 = 1.36 | H3 = −2.40 | H4 = −0.20 | R5 = 127.8 |

Preferred embodiments of the present invention have been described above, but the present invention is not limited to them and it is possible to make various modifications. For example, it will be appreciated that the present invention may be applied not only to a magnetic disk device, but also to other recording devices such as a magneto-optical disk device. Further, the various numeric values used in the embodiments are also merely examples and may be varied depending on a design. It will be appreciated also that the position control section described with reference to FIG. 2, FIG. 3, FIG. 5, and FIG. 6 may be realized by hardware circuits corresponding to the respective modes, but it is preferred to realize by a microprocessor because of flexibility in setting the coefficients. In that case, the velocity control section may also be realized by the same microprocessor.

According to the present invention, it is possible to fast converge positioning by adding an initial value only at a mode switching time in which the initial depends on state variables at the switching time.

What is claimed is:

1. A method for positioning a head in a recording device wherein said device includes a recording media having a plurality of tracks accessed by said head, a motor for moving said head, and a control system having an input signal value representing a difference between a current position of said head and a target track, and a control signal value for driving said motor wherein said input signal value and said control signal value are state variables, said method comprising the steps of:

switching between a velocity control mode and a position control mode when a predetermined input signal value is reached wherein said position control mode includes a settling mode that does not use an integrator and a track follow mode that uses an integrator;

changing the gain of said control system at a time when said velocity control mode is being switched to said settling mode; and adding an additional control value to the control system as a feedforward value only when said velocity control mode is being switched to said settling mode wherein said additional control value nullifies a term of an eigenvalue having a maximum absolute value in a state equation of said control system.

2. The method of claim 1 further comprising the steps of:

switching to a track following mode from said settling mode when a second predetermined input signal value is reached; and using said additional control value as an initial output value of said integrator.

3. The method of claim 2 further comprising the steps of storing an offset value determined when said head was previously in a stationary state during said track following mode and adding the offset value to said initial output value at the switching time from said settling mode to said track following mode.

4. The method of claim 1 wherein both said input signal value and said control signal value are sampled values, and said additional control value added to the control system when said velocity control mode is being switched to said settling mode is generated by multiplying a first input signal value at a mode switching time, a second input signal value and a first control signal value of one sample before the switching time, and a second control signal value of two samples before the switching time with the respective predetermined coefficients, and adding their products.

5. A recording device comprising:
an actuator;
a head attached to said actuator;
a motor attached to said actuator which moves said actuator and said head;
a recording media including a plurality of tracks, said head moved and positioned near said recording media to access said tracks; and
controller means for positioning said head to a target track, said controller means including:
means for switching between a velocity control mode, a settling mode and a track following mode wherein said track following mode uses an integrator and settling mode does not use said integrator;
means for outputting a control signal to drive said motor in response to an input signal value representing a difference between a current position of said head and said target track wherein said control signal and said input signal value are state variables;
means for switching control modes that includes means for switching between said velocity control mode and said settling mode when said input signal value reaches a predetermined value;
means for setting the gain of the control signal during and in response to said switch between said velocity control mode and said settling mode and between said settling mode and said track following mode wherein said means for setting gain of the control signal adds an initial value as an initial feedforward value.

6. The recording device of claim 5 wherein when said input signal value reaches a second predetermined value, said means for switching control modes switches from said settling mode to said track following mode, and said means for setting gain adds an initial output value of said integrator at the switching time.

7. The recording device of claim 6 further comprising means for storing a value wherein an offset value is stored in said means for storing said value when said head was previously in a stationary state during said track following mode, and the offset value is recalled from said means for storing a value and added to said initial output value at the switching time from said settling mode to said track following mode.

8. The recording device of claim 5 wherein said initial feedforward value nullifies a term of an eigenvalue having a maximum absolute value in a state equation of a control system.

9. The recording device of claim 8 wherein both said input signal value and said control signal value are sampled values, and said feedforward value is generated by multiplying a first input signal value at a mode switching time, a second input signal value and a first control signal value of one sample before the switching time, and a second control signal value of two samples before the switching time with the respective predetermined coefficients, and adding their products.

10. A method for producing control signals to control the movement of an actuator in a recording device wherein said actuator includes a head and is controlled in a velocity mode, a settling mode, and a track following mode, said method comprising the steps of:

providing a control system to generate control signals that control the movement of the actuator during each mode and to control the movement of the actuator during the time for changing modes; and changing the gain of the control signal when changing between said velocity mode and settling mode, and when changing between said settling mode and said track following mode, wherein said step of changing the gain of said control signal is done by adding to the control signal value an initial value that nullifies the term of an eigenvalue having a maximum absolute value in a state equation of said control system.

11. The method of claim 10 wherein said step of changing the gain of said control signal when changing between said velocity mode and settling mode is accomplished by adding to said control signal an initial value that includes a feedforward value.

12. The method of claim 10 wherein said step of changing the gain of said control signal when changing between said settling mode and said track following mode is accomplished by adding to said control signal an initial value that includes a previously stored offset value.

13. In a recording device having a head, a recording media including a plurality of tracks accessed by said head, and a motor for moving said head, a method for positioning said head to a target track by switching control modes in a control system and outputting a control signal value to drive said motor in response to an input signal value representing a difference between a current position of said head and said target track, and wherein said control modes include a velocity control mode and a position control mode that includes a settling mode not using an integrator and a track following mode using an integrator, said method comprising the steps of:

switching from said velocity control mode to said settling mode and adding an additional control value when said difference reaches a predetermined value;

changing a gain of the control system when said velocity control mode is switched to said position control mode wherein said input signal value and said control signal value are state variables at a mode switching time of said control modes; and adding an additional control value to the control system as a feedforward value when said difference reaches said predetermined value only during said mode switching time to fast converge to said target track wherein said additional control value added during said mode switching time nullifies a term of an eigenvalue having a maximum absolute value in a state equation of said control system, and wherein both said input signal value and said control signal value are sampled values, and said additional control value added only during said mode switching time is generated by multiplying a first input signal value at said mode switching time with a first predetermined coefficient, a second input signal value and a first control signal value of one sample before the switching time with a second predetermined coefficient, and a second control signal value of two samples before the switching time with a third predetermined coefficient, and adding their products.

14. The method of claim 13 wherein when said difference reaches a second predetermined value said settling mode is switched to said track following mode and said additional control value at the switching time is used as an initial output value of said integrator.

15. The method of claim 14 further including the steps of storing an offset value determined when said head was previously in a stationary state during track following mode, and adding the offset value to the initial output value at the switching time from settling mode to track following mode.

16. A recording device comprising:

an actuator;

a head attached to said actuator;

a motor attached to said actuator which moves said actuator and said head;

a recording media including a plurality of tracks, said head moved and positioned near said recording media to access said tracks; and controller means for positioning said head to a target track, said controller means including:

means for switching control modes and outputting a control signal to drive said motor in response to an input signal value representing a difference between a current position of said head and said target track, and wherein said means for switching control modes switches between a velocity control mode and a position control mode wherein said position control mode includes a settling mode not using an integrator and a track following mode using an integrator; and means for setting the gain of the control signal in response to a switch between the velocity control mode and the position control mode in which said input signal value and said control signal value are state variables, and wherein said means for setting gain of the control signal includes an additional control signal present during a mode switching time, and wherein said means for setting the gain adds an initial value as a feed forward value.

17. The recording device of claim 16 wherein when said difference between a current position of the head and a target track reaches a second predetermined value, said means for switching control modes switches from the settling mode to said track following mode, and said means for setting gain adds an initial value at the switching time as an initial output value of said integrator.

18. The recording device of claim 17, further comprising means for storing an offset value determined during a stationary state of said head during said track following mode, and means for recalling and adding the offset value to said initial output value at the switching time from settling mode to said track following mode.

* * * * *